US011288267B2

(12) United States Patent
Chang et al.

(10) Patent No.: US 11,288,267 B2
(45) Date of Patent: *Mar. 29, 2022

(54) PLUGGABLE STORAGE SYSTEM FOR DISTRIBUTED FILE SYSTEMS

(71) Applicant: EMC IP Holding Company LLC, Hopkinton, MA (US)

(72) Inventors: Lei Chang, Beijing (CN); Tao Ma, Beijing (CN); Zhanwei Wang, Beijing (CN); Lirong Jian, Beijing (CN); Lili Ma, Beijing (CN); Gavin Sherry, San Mateo, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 233 days.

This patent is subject to a terminal disclaimer.

(21) Appl. No.: 16/573,925

(22) Filed: Sep. 17, 2019

(65) Prior Publication Data

US 2020/0012646 A1    Jan. 9, 2020

Related U.S. Application Data

(63) Continuation of application No. 15/150,263, filed on May 9, 2016, now Pat. No. 10,459,917, which is a
(Continued)

(51) Int. Cl.
*G06F 16/2453* (2019.01)
*G06F 16/10* (2019.01)
(Continued)

(52) U.S. Cl.
CPC ........ *G06F 16/24542* (2019.01); *G06F 16/10* (2019.01); *G06F 16/11* (2019.01);
(Continued)

(58) Field of Classification Search
CPC .......... G06F 16/24542; G06F 16/2453; G06F 16/2455; G06F 16/2471; G06F 16/24524;
(Continued)

(56) References Cited

U.S. PATENT DOCUMENTS 5,191,611 A    3/1993  Lang
5,495,607 A    2/1996  Pisello
(Continued)

OTHER PUBLICATIONS

Xie et al. "Improving MapReduce Performance through Data Placement in Heterogeneous Hadoop Clusters," 2010 IEEE International Symposium on Parallel & Distributed Processing, Workshops and Phd Forum (IPDPSW), Atlanta, GA, 2010, pp. 1-9. Year: 2010.
(Continued)

*Primary Examiner* — Robert W Beausoliel, Jr.
*Assistant Examiner* — Susan F Rayyan
(74) *Attorney, Agent, or Firm* — Chamberlain, Hrdlicka, White, Williams & Aughtry

(57) ABSTRACT

A method, article of manufacture, and apparatus for managing data. In some embodiments, this includes an initial instruction for a file stored in a first storage system, determining that the initial instruction is not supported by the first storage system, identifying a combination of instructions to the first storage system after determining that the initial instruction is not supported by the first storage system, wherein the combination of instructions is based on the initial instruction, performing the identified combination of instructions on the file stored in the first storage system, and storing results of the performed identified combination of instructions.

21 Claims, 2 Drawing Sheets

Related U.S. Application Data continuation of application No. 13/843,067, filed on Mar. 15, 2013, now Pat. No. 9,454,548.

(60) Provisional application No. 61/769,043, filed on Feb. 25, 2013.

(51) Int. Cl.

| | | |
|---|---|---|
| *G06F 16/11* | (2019.01) | |
| *G06F 16/27* | (2019.01) | |
| *G06F 16/14* | (2019.01) | |
| *G06F 16/182* | (2019.01) | |
| *G06F 16/907* | (2019.01) | |
| *G06F 16/18* | (2019.01) | |
| *G06F 16/2455* | (2019.01) | |
| *G06F 16/2458* | (2019.01) | |
| *G06F 16/2452* | (2019.01) | |
| *H04L 67/1097* | (2022.01) | |
| *H04L 65/60* | (2022.01) | |
| *G06F 16/43* | (2019.01) | |
| *G06F 16/21* | (2019.01) | |
| *G06F 16/245* | (2019.01) | |

(52) U.S. Cl.
CPC ........ *G06F 16/148* (2019.01); *G06F 16/182* (2019.01); *G06F 16/1858* (2019.01); *G06F 16/2453* (2019.01); *G06F 16/2455* (2019.01); *G06F 16/2471* (2019.01); *G06F 16/24524* (2019.01); *G06F 16/24532* (2019.01); *G06F 16/27* (2019.01); *G06F 16/907* (2019.01); *H04L 65/60* (2013.01); *H04L 67/1097* (2013.01); *H05K 999/99* (2013.01); *G06F 16/113* (2019.01); *G06F 16/217* (2019.01); *G06F 16/245* (2019.01); *G06F 16/43* (2019.01)

(58) Field of Classification Search
CPC .. G06F 16/24532; G06F 16/245; G06F 16/10; G06F 16/11; G06F 16/27; G06F 16/148; G06F 16/182; G06F 16/907; G06F 16/43; G06F 16/113; G06F 16/217; G06F 16/1858; H04L 67/1097; H04L 65/60; H05K 999/99
See application file for complete search history.

(56) References Cited

U.S. PATENT DOCUMENTS

| | | |
|---|---|---|
| 5,655,116 A | 8/1997 | Kirk |
| 5,706,514 A | 1/1998 | Bonola |
| 5,922,030 A | 7/1999 | Shank |
| 6,266,682 B1 | 7/2001 | Lamarca |
| 6,269,380 B1 | 7/2001 | Terry |
| 6,564,252 B1 | 5/2003 | Hickman |
| 6,718,372 B1 * | 4/2004 | Bober .................. G06F 16/188 709/217 |
| 6,745,385 B1 | 6/2004 | Lupu |
| 6,907,414 B1 | 6/2005 | Parnell |
| 6,912,482 B2 | 6/2005 | Kaiser |
| 6,947,925 B2 | 9/2005 | Newcombe |
| 6,996,582 B2 | 2/2006 | Daniels |
| 7,035,931 B1 | 4/2006 | Zayas |
| 7,069,421 B1 | 6/2006 | Yates, Jr. |
| 7,177,823 B2 | 2/2007 | Lam |
| 7,194,513 B2 | 3/2007 | Sharif |
| 7,254,636 B1 | 8/2007 | O'Toole, Jr. |
| 7,313,512 B1 | 12/2007 | Traut |
| 7,346,751 B2 | 3/2008 | Prahlad |
| 7,415,038 B2 | 8/2008 | Ullmann |
| 7,475,199 B1 | 1/2009 | Bobbitt |
| 7,493,311 B1 | 2/2009 | Cutsinger |
| 7,574,443 B2 | 8/2009 | Bahar |
| 7,593,938 B2 | 9/2009 | Lemar |
| 7,613,947 B1 | 11/2009 | Coatney |
| 7,653,699 B1 | 1/2010 | Colgrove |
| 7,689,535 B2 | 3/2010 | Bernard |
| 7,689,609 B2 | 3/2010 | Lango |
| 7,702,625 B2 | 4/2010 | Peterson |
| 7,716,261 B2 | 5/2010 | Black |
| 7,720,841 B2 | 5/2010 | Gu |
| 7,739,316 B2 | 6/2010 | Thompson |
| 7,761,678 B1 | 7/2010 | Bodmer |
| 7,774,335 B1 | 8/2010 | Scofield |
| 7,827,201 B1 | 11/2010 | Gordon |
| 7,949,693 B1 | 5/2011 | Mason |
| 7,958,303 B2 | 6/2011 | Shuster |
| 7,978,544 B2 | 7/2011 | Bernard |
| 7,984,043 B1 | 7/2011 | Waas |
| 8,010,738 B1 | 8/2011 | Chilton |
| 8,028,290 B2 | 9/2011 | Rymarczyk |
| 8,041,735 B1 | 10/2011 | Lacapra |
| 8,051,113 B1 | 11/2011 | Shekar |
| 8,131,739 B2 | 3/2012 | Wu |
| 8,180,813 B1 | 5/2012 | Goodson |
| 8,185,488 B2 * | 5/2012 | Chakravarty .......... G06N 5/022 706/47 |
| 8,195,769 B2 | 6/2012 | Miloushev |
| 8,200,723 B1 | 6/2012 | Sears |
| 8,219,681 B1 | 7/2012 | Glade |
| 8,255,430 B2 | 8/2012 | Dutton |
| 8,255,550 B1 | 8/2012 | Becher |
| 8,301,822 B2 | 10/2012 | Pinto |
| 8,312,037 B1 | 11/2012 | Bacthavachalu |
| 8,332,526 B2 | 12/2012 | Kruse |
| 8,352,429 B1 | 1/2013 | Mamidi |
| 8,392,400 B1 | 3/2013 | Ransil |
| 8,417,681 B1 | 4/2013 | Miloushev |
| 8,452,821 B2 | 5/2013 | Shankar |
| 8,484,259 B1 | 7/2013 | Makkar |
| 8,533,183 B2 | 9/2013 | Hokanson |
| 8,543,564 B2 | 9/2013 | Conrad |
| 8,543,596 B1 | 9/2013 | Kostamaa |
| 8,577,911 B1 | 11/2013 | Stepinski |
| 8,578,096 B2 | 11/2013 | Malige |
| 8,595,237 B1 | 11/2013 | Chaudhary |
| 8,682,853 B2 | 3/2014 | Zane |
| 8,682,922 B2 | 3/2014 | Boneti |
| 8,700,875 B1 | 4/2014 | Barron |
| 8,751,533 B1 | 6/2014 | Dhavale |
| 8,762,330 B1 | 6/2014 | Kick |
| 8,825,752 B1 | 9/2014 | Madhavan |
| 8,832,154 B1 | 9/2014 | Srinivasan |
| 8,856,286 B2 | 10/2014 | Barsness |
| 8,971,916 B1 | 3/2015 | Joyce |
| 9,026,559 B2 | 5/2015 | Bernbo |
| 9,118,697 B1 | 8/2015 | Kishore |
| 9,146,766 B2 | 9/2015 | Shaikh |
| 9,323,758 B1 | 4/2016 | Stacey |
| 9,449,007 B1 | 9/2016 | Wood |
| 9,628,438 B2 | 4/2017 | Hardin |
| 9,674,294 B1 | 6/2017 | Gonthier |
| 9,684,571 B2 | 6/2017 | Modukuri |
| 9,727,588 B1 | 8/2017 | Ostapovicz |
| 9,805,053 B1 | 10/2017 | Tiwari |
| 9,886,217 B2 | 2/2018 | Tsuchiya |
| 9,984,083 B1 | 5/2018 | Tiwari |
| 10,095,800 B1 * | 10/2018 | Yalamanchi .......... G06F 16/217 |
| 2002/0002638 A1 | 1/2002 | Obara |
| 2002/0049782 A1 | 4/2002 | Herzenberg |
| 2002/0133810 A1 | 9/2002 | Giles |
| 2002/0146035 A1 | 10/2002 | Tyndall |
| 2002/0156840 A1 | 10/2002 | Ulrich |
| 2003/0126120 A1 | 7/2003 | Faybishenko |
| 2003/0172094 A1 | 9/2003 | Lauria |
| 2003/0191745 A1 | 10/2003 | Jiang |
| 2003/0229637 A1 | 12/2003 | Baxter |
| 2004/0054748 A1 | 3/2004 | Ackaouy |
| 2004/0078467 A1 | 4/2004 | Grosner |
| 2004/0088282 A1 | 5/2004 | Xu |
| 2004/0098415 A1 | 5/2004 | Bone |

(56) References Cited

U.S. PATENT DOCUMENTS

| | | |
|---|---|---|
| 2004/0143571 A1 | 7/2004 | Bjornson |
| 2004/0205143 A1 | 10/2004 | Uemura |
| 2005/0071338 A1 | 3/2005 | Sugioka |
| 2005/0091287 A1 | 4/2005 | Sedlar |
| 2005/0144254 A1 | 6/2005 | Kameda |
| 2005/0165777 A1 | 7/2005 | Hurst-Hiller |
| 2005/0198401 A1 | 9/2005 | Chron |
| 2005/0216788 A1 | 9/2005 | Mani-Meitav |
| 2006/0005188 A1 | 1/2006 | Vega |
| 2006/0010433 A1 | 1/2006 | Neil |
| 2006/0037069 A1 | 2/2006 | Fisher |
| 2006/0080465 A1 | 4/2006 | Conzola |
| 2006/0136653 A1 | 6/2006 | Traut |
| 2006/0146057 A1 | 7/2006 | Blythe |
| 2006/0149793 A1 | 7/2006 | Kushwah |
| 2006/0173751 A1 | 8/2006 | Schwarze |
| 2006/0212457 A1 | 9/2006 | Pearce |
| 2006/0248528 A1 | 11/2006 | Oney |
| 2007/0282951 A1 | 12/2007 | Selimis |
| 2008/0059746 A1 | 3/2008 | Fisher |
| 2008/0172281 A1 | 7/2008 | Probst |
| 2008/0281802 A1 | 11/2008 | Peterson |
| 2008/0313183 A1 | 12/2008 | Cunningham |
| 2008/0320151 A1 | 12/2008 | McCanne |
| 2009/0007105 A1 | 1/2009 | Fries |
| 2009/0007161 A1 | 1/2009 | Sheehan |
| 2009/0089344 A1 | 4/2009 | Brown |
| 2009/0106255 A1 | 4/2009 | Lacapra |
| 2009/0132609 A1 | 5/2009 | Barsness |
| 2009/0210431 A1 | 8/2009 | Marinkovic |
| 2009/0222569 A1 | 9/2009 | Frick |
| 2009/0222896 A1 | 9/2009 | Ichikawa |
| 2009/0254916 A1 | 10/2009 | Bose |
| 2009/0259665 A1 | 10/2009 | Howe |
| 2009/0265400 A1 | 10/2009 | Pudipeddi |
| 2009/0328225 A1 | 12/2009 | Chambers |
| 2010/0036840 A1 | 2/2010 | Pitts |
| 2010/0042655 A1 | 2/2010 | Tse |
| 2010/0145917 A1 | 6/2010 | Bone |
| 2010/0241673 A1 | 9/2010 | Wu |
| 2010/0274772 A1 | 10/2010 | Samuels |
| 2010/0287170 A1 | 11/2010 | Liu |
| 2011/0113052 A1 | 5/2011 | Hornkvist |
| 2011/0137966 A1 | 6/2011 | Srinivasan |
| 2011/0153662 A1 | 6/2011 | Stanfill |
| 2011/0153697 A1 | 6/2011 | Nickolov |
| 2011/0179250 A1 | 7/2011 | Matsuzawa |
| 2011/0213928 A1 | 9/2011 | Grube |
| 2011/0238814 A1 | 9/2011 | Pitts |
| 2011/0302583 A1 | 12/2011 | Abadi |
| 2011/0313973 A1 | 12/2011 | Srivas |
| 2012/0023145 A1 | 1/2012 | Brannon |
| 2012/0036107 A1 | 2/2012 | Miloushev |
| 2012/0066274 A1 | 3/2012 | Stephenson |
| 2012/0089470 A1 | 4/2012 | Barnes, Jr. |
| 2012/0095952 A1 | 4/2012 | Archambeau |
| 2012/0095992 A1 | 4/2012 | Cutting |
| 2012/0101991 A1 | 4/2012 | Srivas |
| 2012/0166483 A1 | 6/2012 | Choudhary |
| 2012/0185913 A1 | 7/2012 | Martinez |
| 2012/0278471 A1 | 11/2012 | Labowicz |
| 2012/0310916 A1 | 12/2012 | Abadi |
| 2012/0311572 A1 | 12/2012 | Falls |
| 2012/0317388 A1 | 12/2012 | Driever |
| 2012/0323844 A1 | 12/2012 | Chatley |
| 2013/0007091 A1 | 1/2013 | Rao |
| 2013/0036272 A1 | 2/2013 | Nelson |
| 2013/0091094 A1 | 4/2013 | Nelke |
| 2013/0132967 A1 | 5/2013 | Soundararajan |
| 2013/0151884 A1 | 6/2013 | Hsu |
| 2013/0166543 A1 | 6/2013 | Macdonald |
| 2013/0185735 A1 | 7/2013 | Farrell |
| 2013/0198716 A1 | 8/2013 | Huang |
| 2013/0246347 A1 | 9/2013 | Sorenson |
| 2013/0262443 A1 | 10/2013 | Leida |
| 2013/0275653 A1 | 10/2013 | Ranade |
| 2013/0282650 A1 | 10/2013 | Zhang |
| 2014/0059310 A1 | 2/2014 | Du |
| 2014/0136483 A1 | 5/2014 | Chaudhary |
| 2014/0136779 A1 | 5/2014 | Guha |
| 2014/0149392 A1 | 5/2014 | Wang |
| 2014/0188825 A1 | 7/2014 | Muthukkaruppan |
| 2014/0188845 A1 | 7/2014 | Ah-Soon |
| 2014/0195558 A1 | 7/2014 | Murthy |
| 2014/0201234 A1 | 7/2014 | Lee |
| 2014/0337323 A1 | 11/2014 | Soep |
| 2015/0095308 A1* | 4/2015 | Kornacker ........ G06F 16/24534 707/718 |
| 2015/0120711 A1 | 4/2015 | Liensberger |
| 2016/0150019 A1 | 5/2016 | Klinkner |

OTHER PUBLICATIONS

Liao et al. Multi-dimensional Index on Hadoop Distributed File System, 2010, Fifth IEEE International Conference on Networking, Architecture, and Storage, pp. 240-249.

* cited by examiner

PLUGGABLE STORAGE SYSTEM FOR DISTRIBUTED FILE SYSTEMS

CROSS REFERENCE TO RELATED APPLICATIONS

This application is a continuation of co-pending U.S. patent application Ser. No. 15/150,263, entitled PLUGGABLE STORAGE SYSTEM FOR DISTRIBUTED FILE SYSTEMS filed May 9, 2016 which is incorporated herein by reference for all purposes, which is a continuation of U.S. patent application Ser. No. 13/843,067, entitled PLUGGABLE STORAGE SYSTEM FOR DISTRIBUTED FILE SYSTEMS filed Mar. 15, 2013, now U.S. Pat. No. 9,454,548, which is incorporated herein by reference for all purposes, which claims priority to U.S. Provisional Application No. 61/769,043, entitled INTEGRATION OF MASSIVELY PARALLEL PROCESSING WITH A DATA INTENSIVE SOFTWARE FRAMEWORK filed Feb. 25, 2013 which is incorporated herein by reference for all purposes.

FIELD OF THE INVENTION

This invention relates generally to databases, and more particularly to systems and methods for managing datasets in databases.

BACKGROUND OF THE INVENTION

With the large amounts of data generated in recent years, data mining and machine learning are playing an increasingly important role in today's computing environment. For example, businesses may utilize either data mining or machine learning to predict the behavior of users. This predicted behavior may then be used by businesses to determine which plan to proceed with, or how to grow the business.

The data used in data mining and analytics is typically not stored in a uniform data storage system. Many data storage systems utilize different file systems, and those different file systems are typically not compatible with each other. Further, the data may reside in geographically diverse locations.

One conventional method to performing data analytics across different databases includes copying data from one database to a central database, and performing the data analytics on the central database. However, this results in an inefficient use of storage space, and creates issues with data consistency between the two databases.

There is a need, therefore, for an improved method, article of manufacture, and apparatus for managing data.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Figure 1:
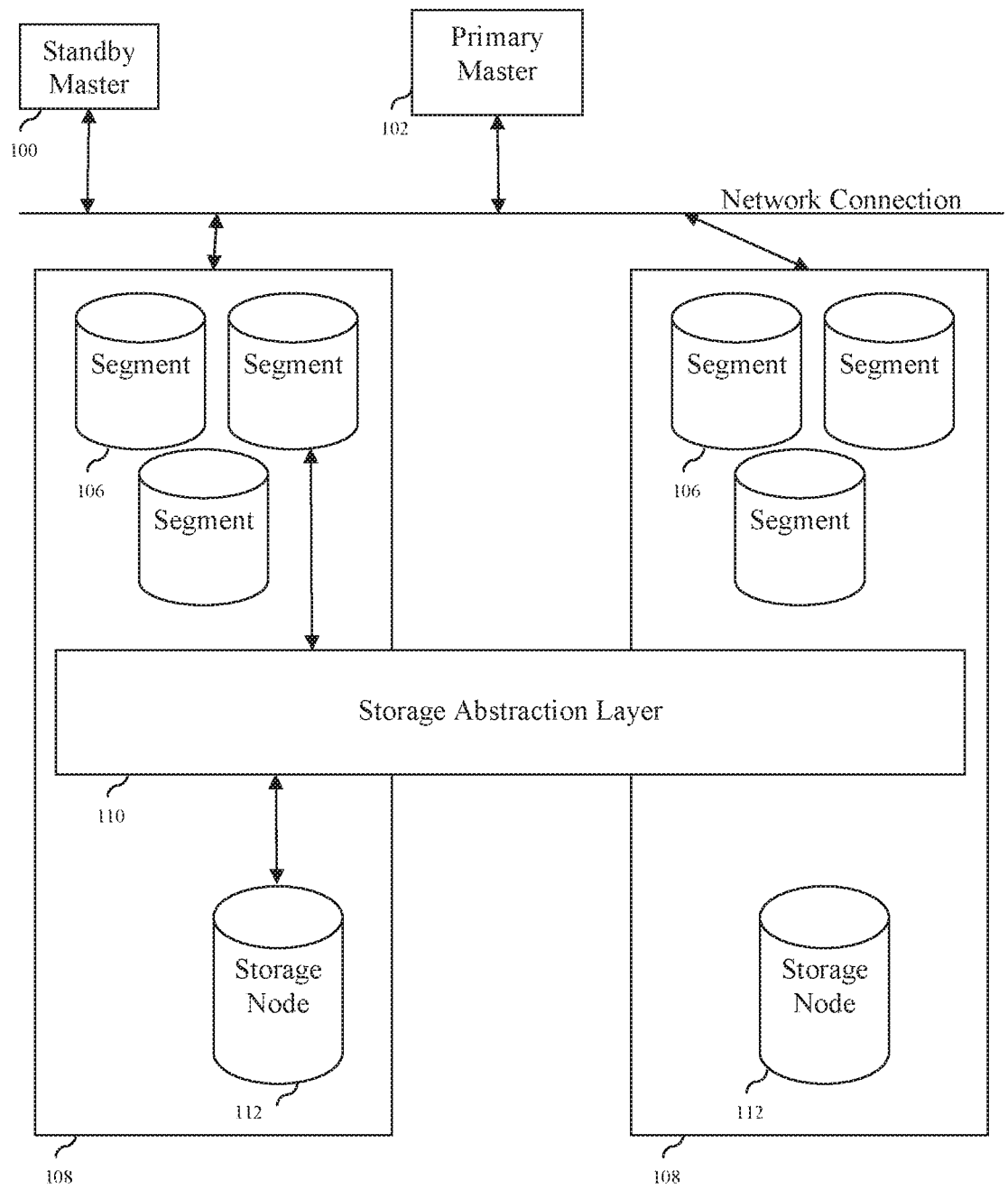
FIG. 1 illustrates a database system in accordance with some embodiments.

FIG. 1 illustrates a database system in accordance with some embodiments. Primary Master 102 accepts queries, plans queries, and dispatches queries to Segments 106 for execution. Primary Master 102 also collects results from Segments 106. Segments 106 are each a compute unit of the database system. Rack 108 can store multiple segments as hosts (hosts not shown in FIG. 1). Standby Master 100 is a warm backup of the primary host. Primary Master 102 and Standby Master 100 communicate to Rack 108 via the network connection. The tables of the database system are stored in Storage Nodes 112. Access, including read and write, are done through Storage Abstraction Layer 110. Primary Master 102, in some embodiments, may include a meta store (not shown in FIG. 1).

The meta store includes information about the different files systems in Storage Nodes 112, such as API information of the file system's interface, and different attributes and metadata of the file system. The meta store also includes information on the binary location of the Storage Abstraction Layer 110. As new file systems are added to the database system, the new file systems are registered (e.g. provided API information, other attributes, etc.) with the meta store. Once the new file systems are added, instances of that file system may be created to store data objects, such as databases and tables.

The storage nodes may be different file systems. For example, one storage node may be Hadoop File System (HDFS), while another storage node may be NFS. Having multiple file systems presents some challenges. One challenge is that file systems do not support all the same commands. The Storage Abstraction Layer helps address this challenge.

In some embodiments, the Storage Abstraction Layer selects a file system instance. A file system instance means a physical storage system for a specific file system. As discussed above, there may be several different file systems, and several different instances. The instances may be of the same file system, or they may be of different file systems. Different file systems may have different semantics or different performance characteristics. For example, some file systems allow you to update data, while other file systems only let you append data. The Storage Abstraction Layer chooses a file system based on the file system's attributes.

For example, in some embodiments, if a user wanted to modify or update a file that is stored on an underlying storage system which does not support file modification, the Storage Abstraction Layer may recognize the update command and move the file from the underlying storage system to another which does support file modification. The move may be temporary (e.g. move the file back after the user is finished with the file), or the move may be permanent.

In some embodiments, the Storage Abstraction Layer may choose to store a data object in a file system that does not allow updating. This may be preferable in cases where the data object is only read and never modified, and the file system is efficient for retrieving data. Thus, the Storage Abstraction Layer may take into account the usage statistics of the data object to determine what file system to use to store the data.

In some embodiments, the Storage Abstraction Layer may perform semantic adaptation. This may be preferable when the underlying file system may not be able to communicate directly with segments. This may occur when the interface the Storage Abstraction Layer exposes to the segment execution engine does not match with the semantics of the underlying file system. Other examples include instances where the functionality required by the segments is not supported by the underlying file system.

For example, a user may wish to truncate a file. However, the file may be stored on a segment where the underlying storage does not allow truncating files. The user is not aware of this because the user is not aware of where the files are physically stored. Typically, without a Storage Abstraction Layer, the underlying file system would not be able to understand the truncate command.

One example of semantic adaption includes adapting the truncate command. Suppose that a segment requires a piece of data to be truncated. However, the underlying file system does not support the truncate functionality. The Storage Abstraction Layer may be able to put various commands together to mimic a truncate command. Since the Storage Abstraction Layer has access to the metadata of the file system stored in the meta store, it knows what commands are allowed in the file system, as well as how to access the file system via APIs. Suppose that the file to be truncated is File A, and File A consists of 20 bytes. The segment wants the last 10 bytes to be deleted. With this requirement, the Storage Abstraction Layer may employ semantic adaptation to complete the truncation even when the underlying file system does not support a truncate command. In some embodiments, the Storage Abstraction Layer may first copy the first 10 bytes of File A to a temporary file, called File B. Then, the original File A is deleted, leaving only the temporary File B. After the original File A is deleted, the temporary File B is renamed to File A. File A is now only half of the original File A. In other words, File A has been truncated, even though the underlying file system did not support truncation. The Storage Abstraction Layer, by understanding how to access the underlying file system via the meta store, sent a series of commands to mimic a truncate. This series of commands may be stored in the meta store so that future truncate requests may make use of it.

Another example of semantic adaption includes a file update command. As mentioned above, some file systems do not allow for updating a file. Suppose a segment required that a file be updated. However, the file is stored in a file system that does not allow files to be updated. In some embodiments, the Storage Abstraction Layer may record the modifications in separate file as a new version. For example, if File A was to be modified, the separate file may be called File A_ver2. The segment (or user) will see that changes are being made to File A, but in fact, File A remains unchanged and the changes are being stored in File A_ver2. After the segment is finished modifying or updating the file, there may be two files stored—one is File A, and the other is File A_ver2. When subsequent users want to access File A, the Storage Abstraction Layer may cause the two files to be merged. With File A merged with File A_ver2 and called File A, the new File A will include all the changes made by the previous user. In other words, File A has been modified, even though the underlying file system did not support updating.

With the Storage Abstraction Layer, many different file systems may be supported. New and different storage systems with different file systems may be "plugged" into the database, without affecting the ability for the database to run its queries or jobs, as long as the meta store is updated with information about the new file system, such as its APIs.

Figure 2:
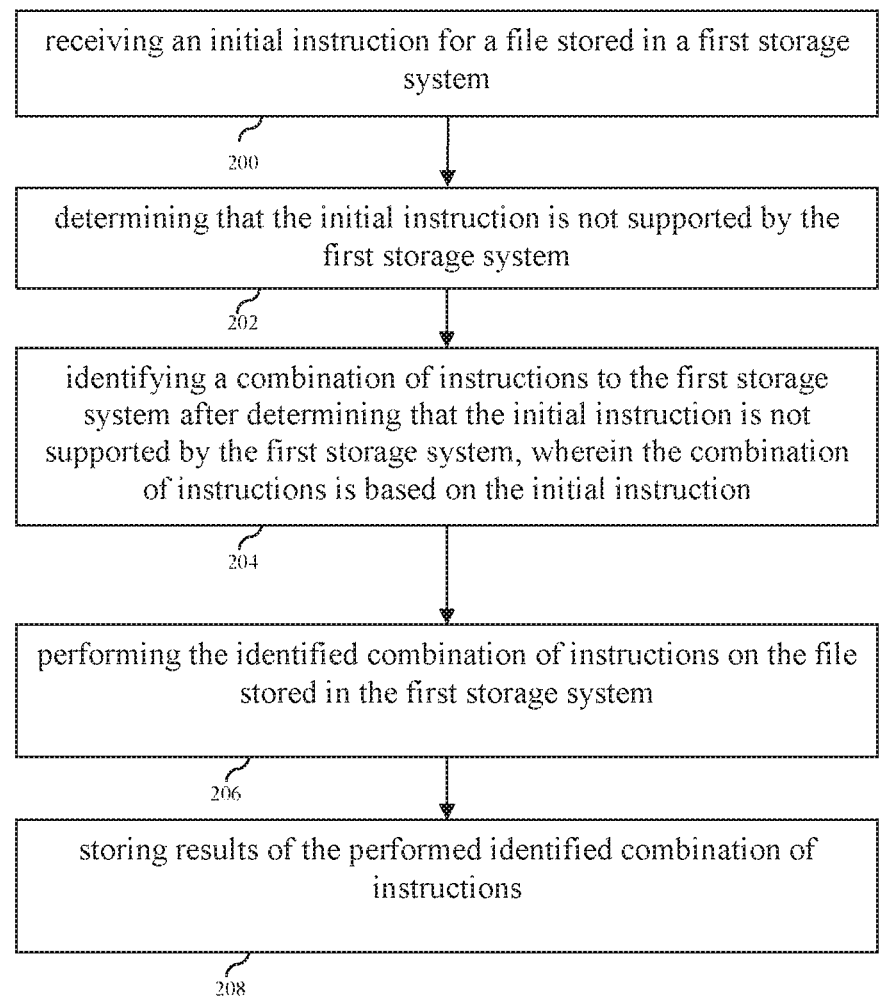
FIG. 2 is a flowchart of a method to manage data in accordance with some embodiments.

FIG. 2 illustrates a method to manage data in accordance with some embodiments. In step 200, an initial instruction for a file stored in a first storage system is received. In step 202, it is determined that the initial instruction is not supported by the first storage system. In step 204, a combination of instructions to the first storage system is identified after determining that the initial instruction is not supported by the first storage system, wherein the combination of instructions is based on the initial instruction. In step 206, the identified combination of instructions is performed on the file stored in the first storage system. In step 208, results of the performed identified combination of instructions are stored.

For the sake of clarity, the processes and methods herein have been illustrated with a specific flow, but it should be understood that other sequences may be possible and that some may be performed in parallel, without departing from the spirit of the invention. Further, though the techniques herein teach creating one SwR sample in parallel, those with ordinary skill in the art will readily appreciate that the techniques are easily extendable to generate many SwR samples. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method, comprising:
   receiving, by an interfacing module that operatively connects a segment execution engine and a first storage system, an initial instruction for a file stored in the first storage system;
   determining, by the interfacing module, that the initial instruction is not supported by the first storage system;
   determining, by the interfacing module and based on metadata associated with the first storage system, a set of one or more instructions to perform with respect to the file, the one or more instructions performing a function corresponding to the initial instruction;
   performing the set of at least one instruction with respect to the file stored in the first storage system; and
   storing results of the performed set of at least one instruction.

2. The method of claim 1, wherein the set of at least one instruction comprises a combination of instructions.

3. The method of claim 1, wherein the set of at least one instruction to perform with respect to the file is determined based at least in part on the metadata associated with the first storage system, and the metadata associated with the first storage system is stored in a meta store that includes information respectively associated with one or more storage systems.

4. The method of claim 1, wherein the set of at least one instruction to perform with respect to the file is determined based at least in part on the metadata associated with the first storage system, and the metadata associated with the first storage system indicates a mechanism for accessing a file system corresponding to the first storage system.

5. The method of claim 1, wherein the set of at least one instruction to perform with respect to the file comprises one or more instructions that are determined based at least in part on the metadata associated with the first storage system.

6. The method of claim 1, wherein the set of at least one instruction to perform with respect to the file comprises one or more instructions that are determined based at least in part on the initial instruction.

7. The method of claim 1, further comprising:
   selecting a second storage system to which the file is to be moved;
   storing the file on the second storage system; and
   performing a series of actions in connection with carrying out a collective result corresponding to the initial instruction.

8. The method of claim 7, wherein the set of at least one instruction to perform with respect to the file comprises one or more instructions, the one or more instructions include one or more of the selecting of the second storage system, the storing of the file on the second storage system, and the performing of the series of actions in connection with carrying out the collective result.

9. The method of claim 7, wherein the second storage system is selected based at least in part on the second storage system having a second file system.

10. The method of claim 7, further comprising:
    in response to performing the series of actions, moving the file to the first storage system.

11. The method of claim 1, wherein the initial instruction includes a truncate instruction.

12. The method of claim 11, wherein the set of at least one instruction to perform with respect to the file include copy a first portion of the file, delete the file, and rename the first portion of the file.

13. The method of claim 1, wherein the initial instruction includes an update instruction.

14. A system, comprising a storage device and at least one processor configured to:
    receive, by an interfacing module that operatively connects a segment execution engine and a first storage system, an initial instruction for a file stored in the first storage system;
    determine, by the interfacing module, that the initial instruction is not supported by the first storage system;
    determining, by the interfacing module and based on metadata associated with the first storage system, a set of one or more instructions to perform with respect to the file, the one or more instructions performing a function corresponding to the initial instruction;
    perform the set of at least one instruction with respect to the file stored in the first storage system; and
    store results of the performed set of at least one instruction.

15. The system of claim 14, wherein the set of at least one instruction to perform with respect to the file is determined based at least in part on the metadata associated with the first storage system, and the metadata associated with the first storage system is stored in a meta store that includes information respectively associated with one or more storage systems.

16. The system of claim 14, wherein the set of at least one instruction to perform with respect to the file is determined based at least in part on the metadata associated with the first storage system, and the metadata associated with the first storage system indicates a mechanism for accessing a file system corresponding to the first storage system.

17. The system of claim 14, wherein the set of at least one instruction to perform with respect to the file comprises one or more instructions that are determined based at least in part on the metadata associated with the first storage system.

18. The system of claim 14, wherein the set of at least one instruction to perform with respect to the file comprises one or more instructions that are determined based at least in part on the initial instruction.

19. The system of claim 18, wherein the set of at least one instruction to perform with respect to the file comprises one or more instructions that cause the processor to perform one or more of the selecting of the second storage system, the storing of the file on the second storage system, and the performing of the series of actions in connection with carrying out the collective result.

20. The system of claim 14, wherein the at least one processor is further configured to:

select a second storage system to which the file is to be moved;

store the file on the second storage system; and perform a series of actions in connection with carrying out a collective result corresponding to the initial instruction.

21. A computer program product, comprising a non-transitory computer readable medium having program instructions embodied therein for:

receiving, by an interfacing module that operatively connects a segment execution engine and a first storage system, an initial instruction for a file stored in the first storage system;

determining, by the interfacing module, that the initial instruction is not supported by the first storage system;

determining, by the interfacing module and based on metadata associated with the first storage system, a set of one or more instructions to perform with respect to the file, the one or more instructions performing a function corresponding to the initial instruction;

performing the set of at least one instruction with respect to the file stored in the first storage system; and storing results of the performed set of at least one instruction.

* * * * *